Figure 1:
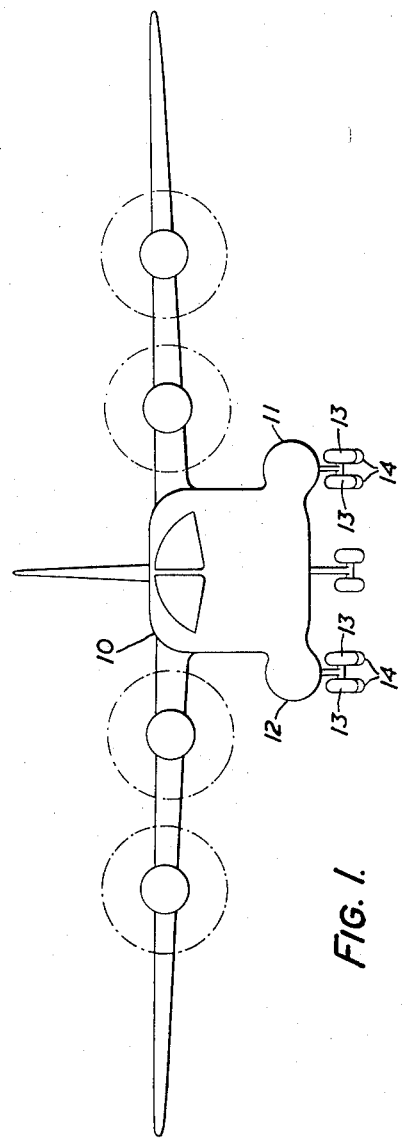

June 26, 1962     A. A. J. WILLITT     3,041,020
AIRCRAFT UNDERCARRIAGE

Filed May 26, 1959     2 Sheets-Sheet 1

INVENTOR
ARTHUR A. J. WILLITT
BY Reynolds, Beach &
Christensen
ATTORNEYS

June 26, 1962

A. A. J. WILLITT 3,041,020

AIRCRAFT UNDERCARRIAGE

Filed May 26, 1959

2 Sheets-Sheet 2

INVENTOR
ARTHUR A. J. WILLITT
BY Reynolds, Beach &
Christensen
ATTORNEYS

United States Patent Office 3,041,020
Patented June 26, 1962

3,041,020
AIRCRAFT UNDERCARRIAGE
Arthur A. J. Willitt, Cheltenham, England, assignor to Dowty Rotol Limited, a British company
Filed May 26, 1959, Ser. No. 815,969
Claims priority, application Great Britain May 27, 1958
1 Claim. (Cl. 244—102)

This invention relates to multi-wheel undercarriages for aircraft and particularly to main undercarriages for heavy aircraft suitable for carrying large loads of freight or passengers.

One disadvantage of using heavy aircraft is the high load applied by the undercarriage to prepared runways of concrete or other hard material. The application of aircraft loads, particularly when static, along a single transverse axis below the wheels of a main undercarriage can cause cracking or subsidence. To overcome this, multi-wheel undercarriages have been used comprising for each main undercarriage component two or more wheels mounted on transverse axles spaced one behind the other in tandem on a bogie frame of either rigid or jointed construction. The bogie frame carrying the wheels is mounted for vertical shock absorbing movement relative to the aircraft.

The present invention is based on the realization that it is not always essential to provide for shock absorbing movement of the entire wheel-carrying structure, since the number and distribution of wheels is generally chosen for load distribution reasons, while a less massive and extensive structure would be sufficient if a design suitable for shock absorption alone were under consideration.

Broadly considered the invention comprises the combination in a main undercarriage component of two wheel mountings spaced longitudinally one behind the other, of which one is substantially rigid in its operative position while the other is shock absorbing, with the shock absorber in its unloaded condition maintaining the wheel or wheels carried thereby below the wheels or wheels carried by the rigid mounting. Thus the wheel or wheels on the shock absorbing mounting sustain the load of the aircraft during landing while the wheels of both mountings sustain and distribute the weight of the aircraft during normal ground running or static conditions. By means of this combination the inertial mass of undercarriage structure displaced during shock absorption movement on landing is substantially reduced compared with that of a conventional bogie undercarriage, while the known expedient for reducing shock drag load on the undercarriage when landing by spinning up one set of main undercarriage wheels before another set in tandem with it is also achieved.

Figure 2:
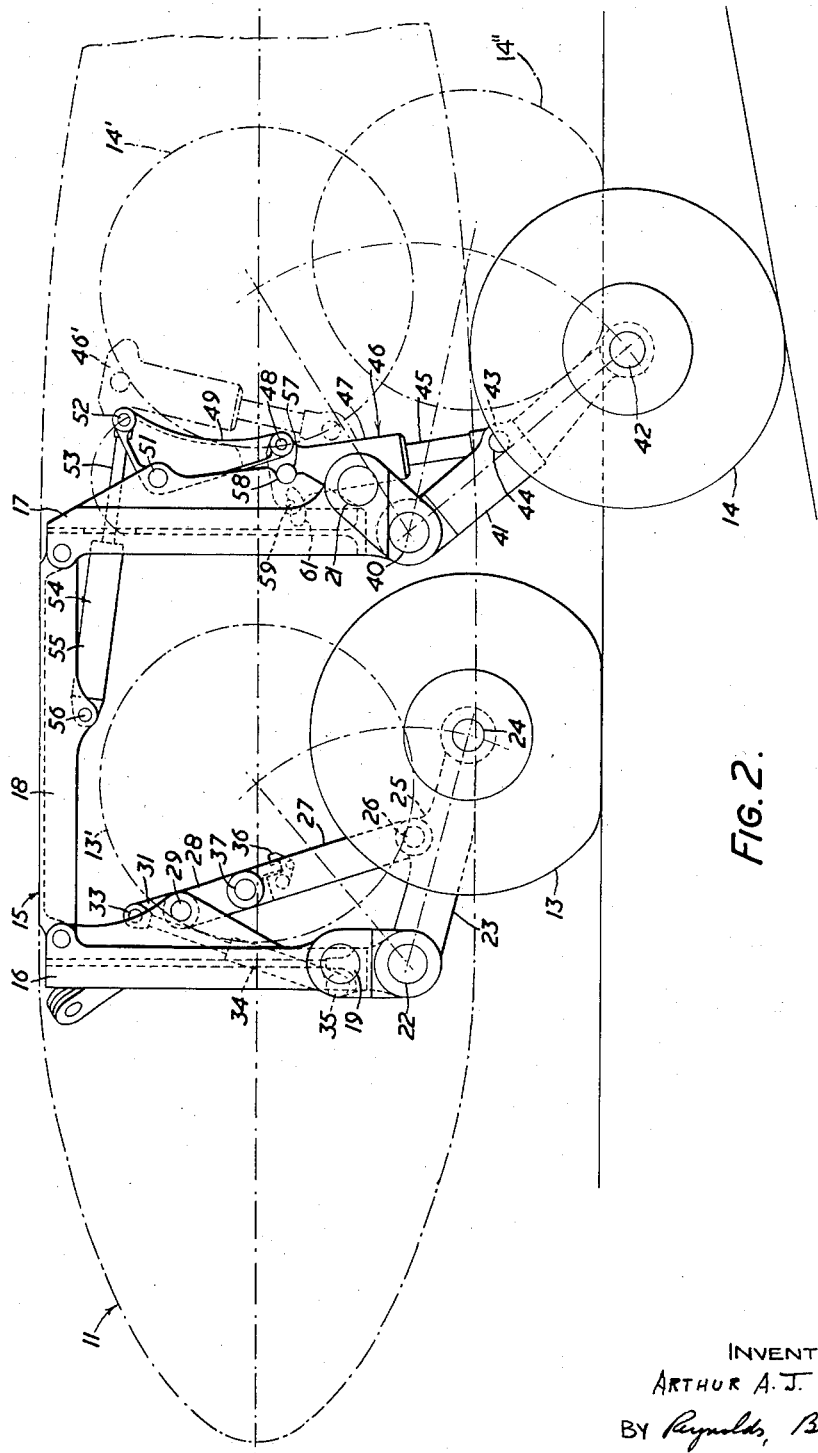

The invention is illustrated in the accompanying drawings of which:

FIGURE 1 is a front elevation of an aircraft fitted with a tandem main undercarriage; and FIGURE 2 is a side elevation of the main undercarriage component on one side of the aircraft, with the fairing around the pod in which it is mounted removed to show interior details.

Referring to FIGURE 1, the aircraft fuselage 10 is seen with pods 11 and 12 on opposite sides, which provide a mounting for the aircraft undercarriage components and into which the components may be retracted when the aircraft is airborne. The undercarriage component on each side comprises a pair of wheels 13 mounted on a common axle in the forward portion of the pod 11, and a tandem pair of wheels 14, mounted on a common axle in the rear part of the pod 11.

FIGURE 2 shows the outline of the pod 11 containing a wheel-supporting framework 15 which is to be understood as being rigidly attached to main structural members of the fuselage. The wheel-supporting framework comprises a front bracket 16, and a rear bracket 17, both extending generally vertically within the pod 11, while a beam 18 extends horizontally between the two brackets. The lower part of the front bracket 16 has a socket 19 and the lower part of the rear bracket 17 has a socket 21, both of which sockets 19 and 21 may be rigidly secured to tubular elements projecting laterally from the structure of the main fuselage to provide part of the attachment to the fuselage.

Below the socket 19, the front bracket 16 carries a pivot pin 22, for a lever 23, the outer end of which carries an axle 24 for the front pair of wheels 13. A lug 25 at an intermediate position on the lever 23 carries a pivot pin 26 on which the lower link 27 of a jointed strut is mounted. The upper link 28 of the strut is mounted on a pivot pin 29, which is secured in the upper portion of the bracket 16, while an arm 31 united with the link 28 extends on the opposite side of the pivot 29 to provide a connection 33 for a retracting jack 34. This retracting jack is pivotally mounted at 35 on the lower part of the bracket 16, and in the position shown maintains the two links 27 and 28 in line. A pivoted lock 36, holds the strut from breaking about the common pivot 37 which connects the two links 27 and 28. The strut formed by the links 27 and 28 may be broken upon contraction of the jack 34 to retract the wheels within the pod 11 to the position shown at 13'. The lower end portion of the rear bracket 17 carries a pivot pin 40 for a lever 41 whose lower end is provided with an axle 42 on which the pair of wheels 14 are mounted. A lug 43 at an intermediate position on the lever 41 carries a pivot pin 44 on which the piston rod 45 of a hydraulic shock absorber 46 is mounted. The shock absorber cylinder 47 carries an offset pivot pin 48, by which connection is made with a bell crank lever 49.

The fulcrum of the bell crank lever 49 is pivotally mounted by a pin 51 to the upper portion of the bracket 17, while the other arm of the bell crank lever carries a pivot 52 forming a connection for the piston rod 53 of a retraction jack 54, the cylinder 55 of the retraction jack being pivoted to the beam 18 at 56.

The shock absorber 46 is shown in full lines in the extended condition of the undercarriage and it is held in this position by trunnions 57 seated against a generally semi-circular recess 58 formed in the side of the bracket 17. This recess 58 takes the reaction load on the line of the shock absorber axis and it can slide readily in and out of the recess 58 under the turning movement of the bell crank lever 49 actuated by the retraction jack 54. A locking pin 59 on the opposite side of the trunnion 58 from the pivot pin 48 is engageable by a latch 61 pivoted on the bracket 17 to secure the shock absorber 46 in the position shown. The latch 61 and the retraction jack 54 may be inter-related in known manner whereby the latch 61 is caused to disengage the pin 59 before the jack 54 can retract, and conversely that at the end of the extension movement of the jack 54 the latch 61 shall automatically engage the pin 59 to hold the shock absorber 46 in its extended position. The retracted position of the shock absorber is shown at 46' and of the wheels at 14', within the pod 11.

When the aircraft is airborne and the undercarriage extended, the front pair of wheels 13 occupy the position shown in full lines while the rear pair of wheels 14 occupy the position shown in full lines, where they project considerably below the level of the front pair of wheels 13. When the aircraft touches down the shock absorber 46 will, however, yield through substantially its full stroke under the ground load applied to the lower wheels 14, allowing these wheels to rise relatively to the pod 11 to the position 14″ which is substantially at the same level as the front pair of wheels 13.

The shock absorbers 46 on both sides of the aircraft must be capable of substantially absorbing the greatest landing shock for which the undercarriage is designed. A convenient form of shock absorber known as a liquid spring comprises a piston rod which is movable into a liquid filled cylinder and which carries a damping head slidable in the bore of the cylinder. The damping head is capable of dissipating the greater part of the energy of a heavy landing shock during movement of the wheels 14 to the position at 14′, while the remainder of the energy is stored in part by compression of the liquid filling the cylinder, and in part by yielding of the tyres of the wheels 13 and 14.

In order that the weight of the aircraft shall be shared between the front and rear wheels of the main undercarriage components, the shock absorber 46 is given a designed spring rate which enables the rear wheels 14 to support approximately half the weight in the position 14″. Since the weight of the aircraft will vary according to loading it is desirable to obtain an equal distribution of load for the worst condition, i.e. maximum permitted all-up weight. The highest shock may occur on touch down in the event of a heavy landing but the aircraft will then be travelling rapidly so that the duration of load at any one point would not be sufficient to cause damage to the runway, though if such load were borne statically then it might well cause cracking or subsidence. By the time the aircraft is slowed down to rest the weight will be more or less evenly distributed between the front and rear sets of tandem wheels 13 and 14.

Reference has been made above to the wheel 13 as the forward wheel and 14 as the rearward wheel. This is the preferred arrangement, yet insofar as concerns the absorbing of landing load by one wheel and the subsequent support of the total static load by two wheels, it is not essential that the lower wheel be the rear one; this disposition might be reversed.

I claim as my invention:

An aircraft undercarriage component for distribution of the static load of a heavy aircraft, comprising a first wheel mounting which in position of use is generally upright and includes an upper member and a lower member mounted on and for movement vertically relative to the upper member, a first wheel axle carried by said lower member, a shock absorber reacting between said upper and lower members and in its least loaded condition urging the lower member and its first wheel axle to a depressed position for absorption of landing loads, but yieldable upwardly to an upper limit position under such landing loads, a second wheel mounting independent of and spaced longitudinally of the aircraft from the first wheel mounting, and in position of use being substantially rigid and upright, a second wheel axle carried at the lower end of the second wheel mounting at a fixed level approximating the level of the upper limit position of the movable first wheel axle, for support of the aircraft when ground-borne conjointly by the two wheel axles and their respective wheel mountings, when the first wheel axle is substantially in its upper limit position, and means individual to each wheel mounting to retract each thereof from and to project it into its position of use.

References Cited in the file of this patent

UNITED STATES PATENTS

| | | |
|---|---|---|
| 1,385,770 | Barling | July 26, 1921 |
| 1,804,817 | Silverman | May 12, 1931 |
| 2,212,931 | Colvin | Aug. 27, 1940 |
| 2,438,255 | Stalker | Mar. 23, 1948 |
| 2,811,326 | Westcott | Oct. 29, 1957 |

FOREIGN PATENTS

| | | |
|---|---|---|
| 821,573 | France | Aug. 30, 1937 |